Sept. 19, 1950 R. B. PERRY 2,522,689
METHOD FOR MAKING SHOULDER PADS
Filed Jan. 14, 1947 7 Sheets-Sheet 1

INVENTOR
ROBERT B. PERRY
BY
ATTORNEY

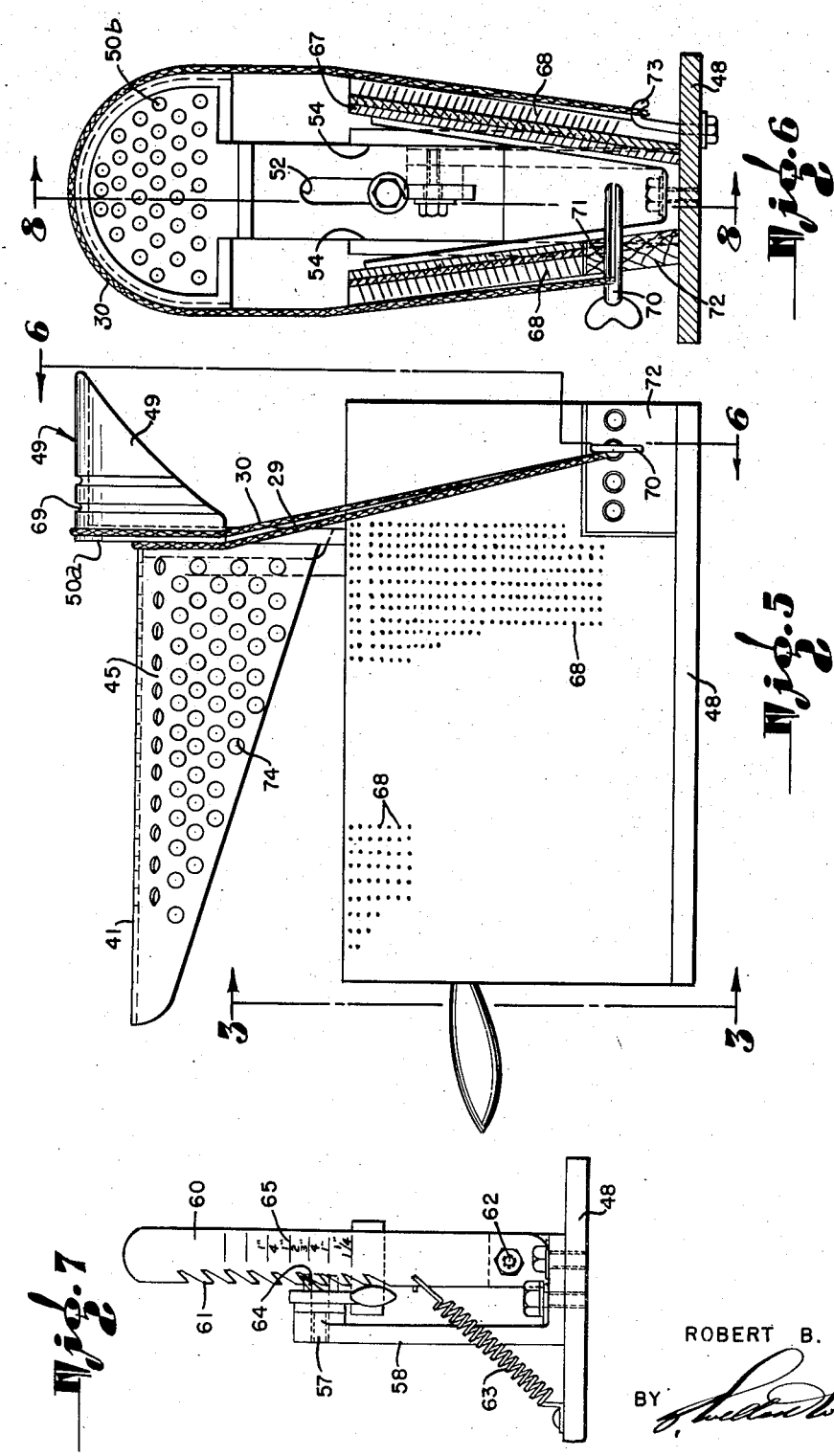

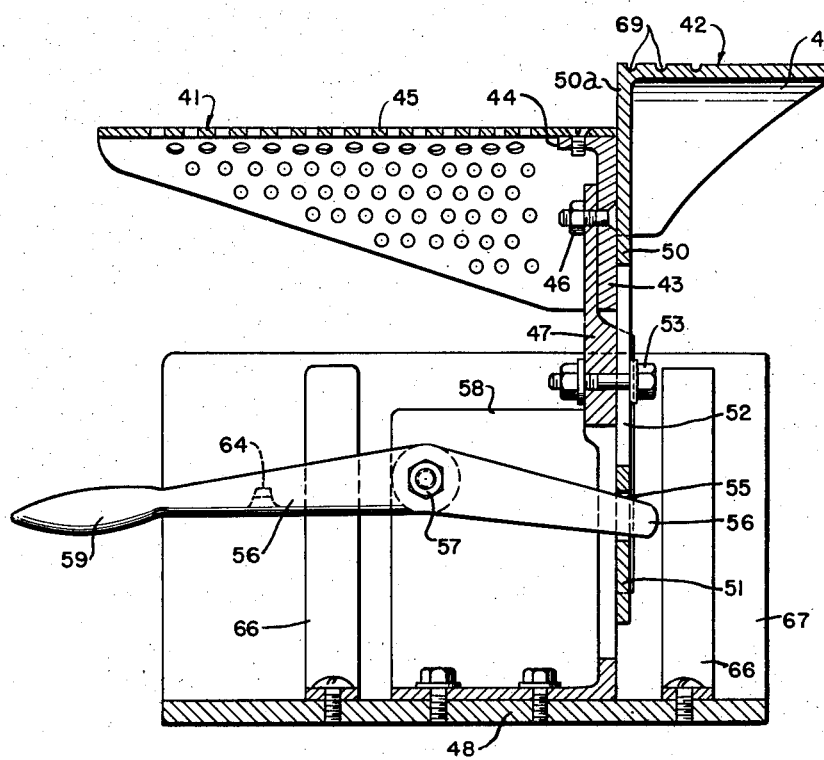

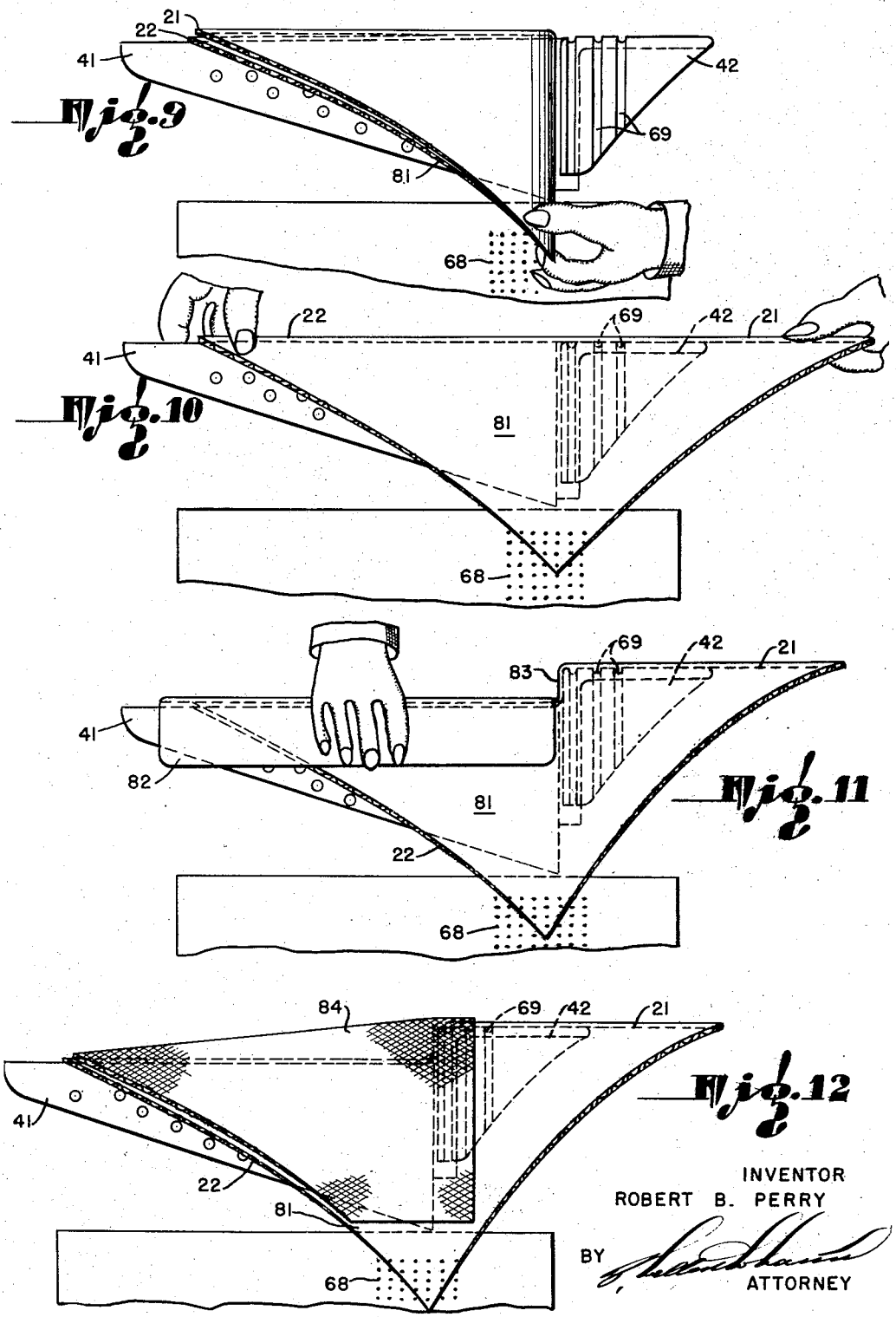

Sept. 19, 1950 R. B. PERRY 2,522,689
METHOD FOR MAKING SHOULDER PADS
Filed Jan. 14, 1947 7 Sheets-Sheet 5
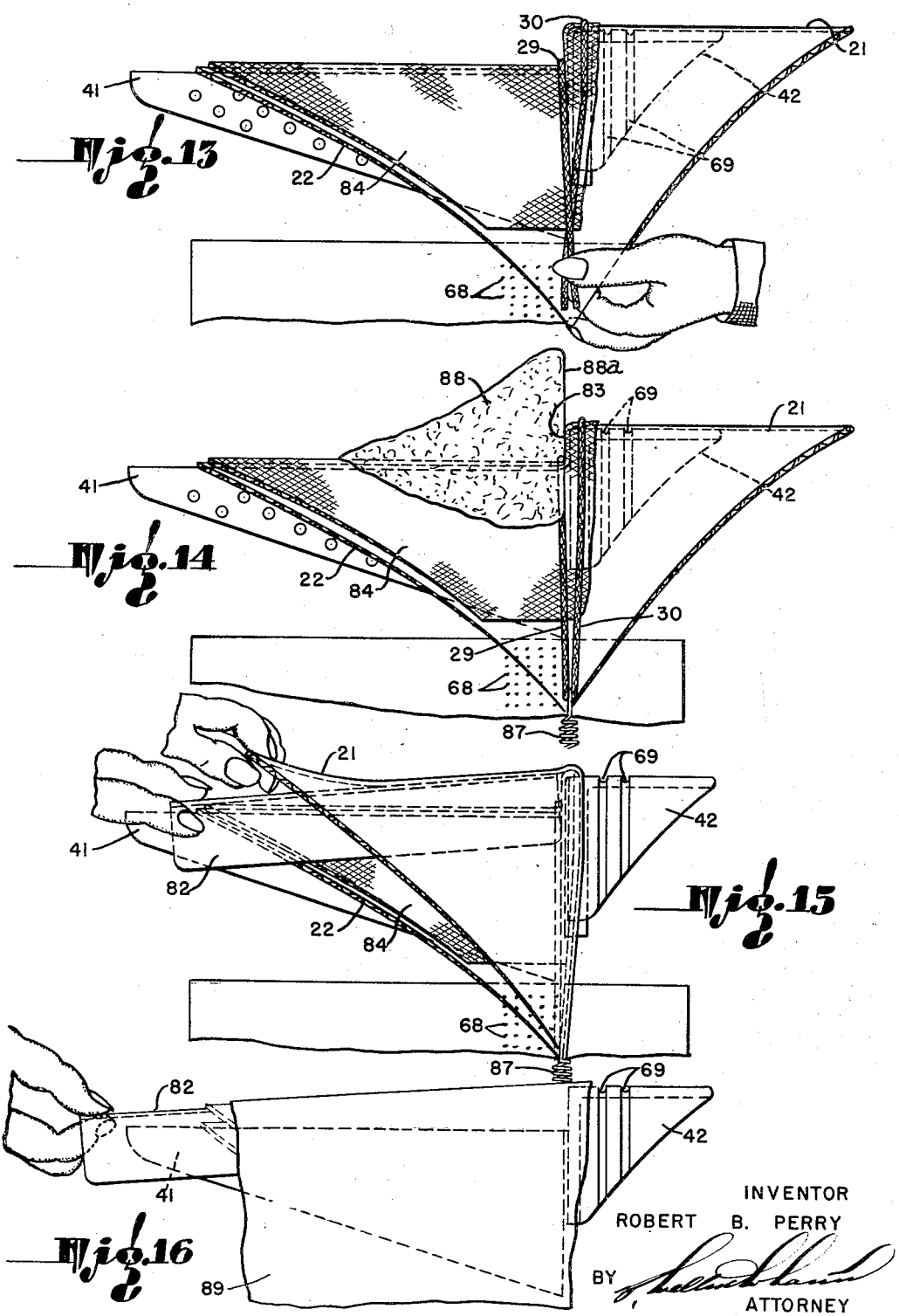
INVENTOR
ROBERT B. PERRY
BY
ATTORNEY Sept. 19, 1950 — R. B. PERRY — 2,522,689
METHOD FOR MAKING SHOULDER PADS
Filed Jan. 14, 1947 — 7 Sheets-Sheet 6
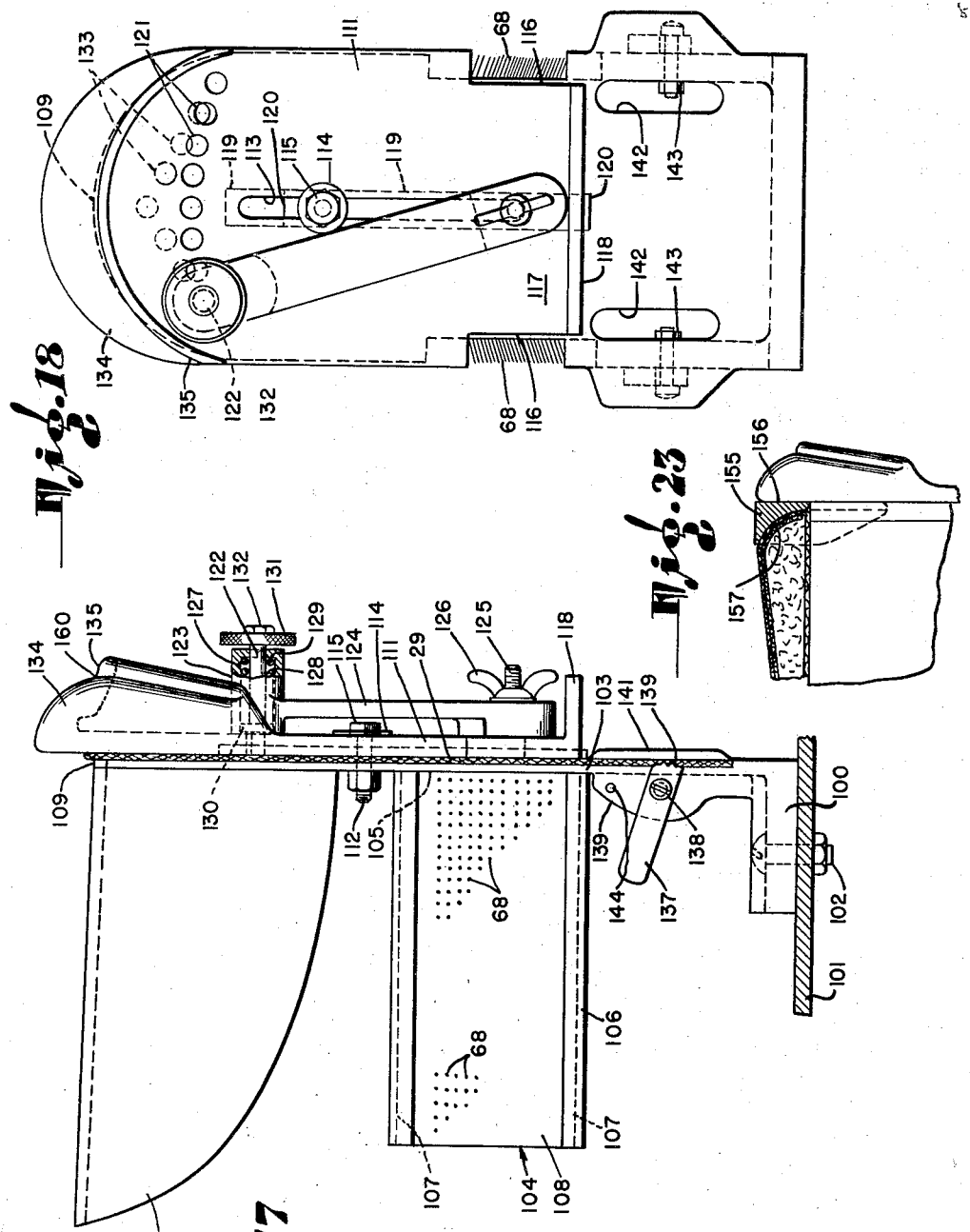
INVENTOR
ROBERT B. PERRY
BY
ATTORNEY Sept. 19, 1950 R. B. PERRY 2,522,689
METHOD FOR MAKING SHOULDER PADS
Filed Jan. 14, 1947 7 Sheets-Sheet 7
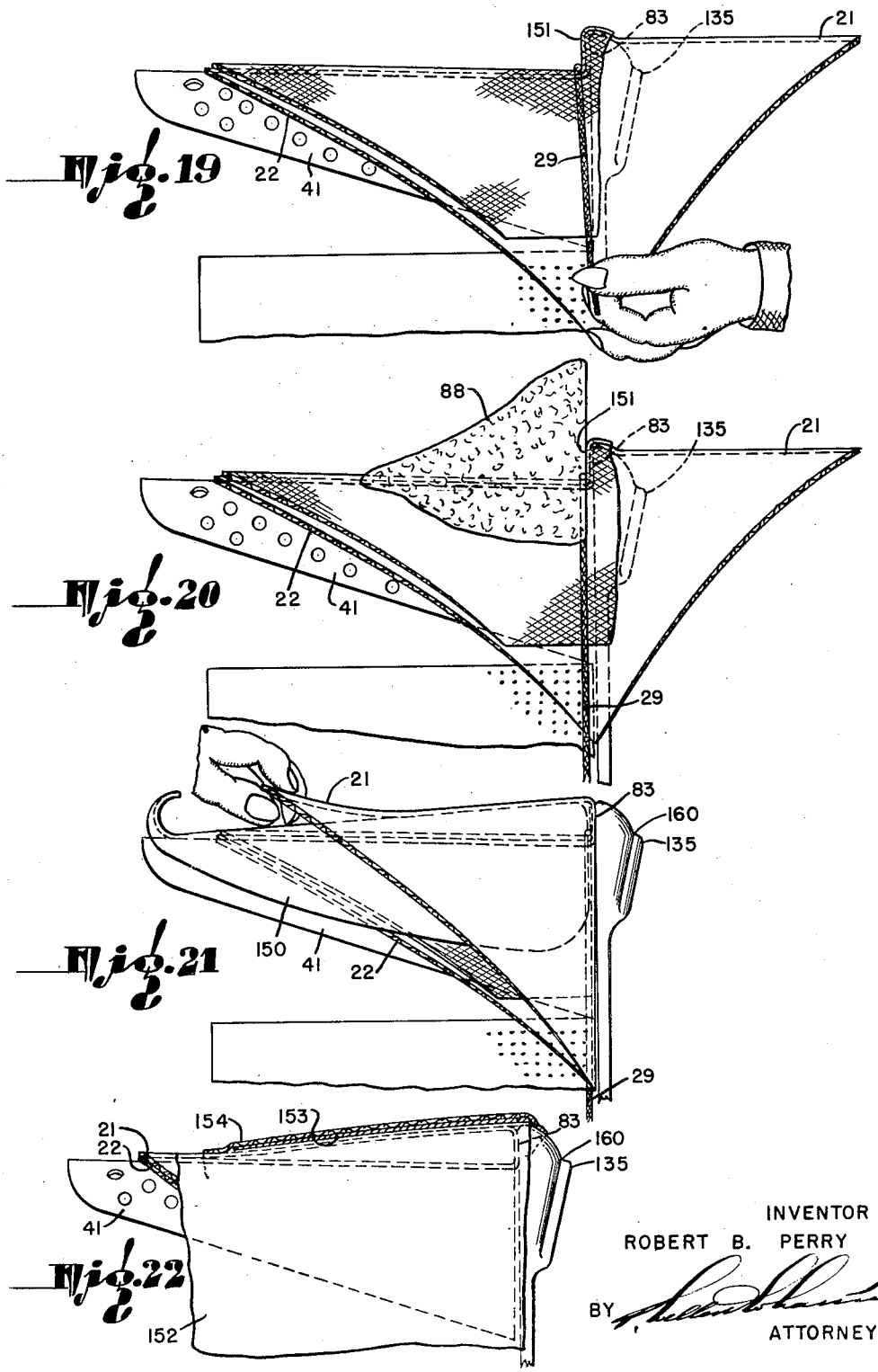

Patented Sept. 19, 1950

2,522,689

UNITED STATES PATENT OFFICE 2,522,689

METHOD FOR MAKING SHOULDER PADS

Robert B. Perry, Los Angeles, Calif.

Application January 14, 1947, Serial No. 721,896

45 Claims. (Cl. 223—57)

This invention relates to a method of manufacturing shoulder pads for garments, the present application being a continuation in part of my copending application, Serial No. 590,703, filed April 27, 1945, for a Shoulder Pad, Method and Apparatus for Making the Same. This copending application describes and claims a shoulder pad, and discloses a method for constructing same, together with apparatus for carrying out said method.

It is one of the objects of the present invention to provide an improved method of manufacturing shoulder pads.

Another object of the invention is to provide a method of manufacturing shoulder pads having greatly improved form retaining characteristics.

It is another object of the invention to provide a method of this character for manufacturing shoulder pads whereby the pads may be quickly and accurately formed.

Still another object of the invention is to provide a method of this character whereby shoulder pads may be made having top, bottom and end walls formed of a single sheet of cover material.

It is still another object of the invention to provide a method of this character whereby shoulder pads may be manufactured having the sheet of covering material, a sheet of stiffening or reinforcing fabric, and a bat of filling material.

A further object of the invention is to provide a method of this character, wherein the pads are formed on jigs to which they are secured, and then subjected to a heat treatment, after which they are removed from the jigs, sewed about the thinner parts, and trimmed.

A further object of the invention is to provide a method of this character wherein there are members for securing the pads to the respective jigs adjacent the thicker ends of said pads. These members may also be left within the pad for reinforcing same.

It is a further object of the invention to provide a method of this character for manufacturing shoulder pads of the character disclosed in the above referred to copending application.

It is a still further object of the present invention to provide a method for manufacturing shoulder pads of various types and characteristics.

Further objects and advantages of the invention will be brought out in the following part of the specification.

Referring now to the drawings which are for illustrative purposes only,

Fig. 5 is a side elevation of the apparatus or fixture used in building the pad;

Fig. 6 is an end view of said apparatus or fixture, partially in section, as indicated by the line 6—6 of Fig. 5;

Fig. 7 is a detail elevation of the elevating lever and cooperating latch of said apparatus;

Fig. 8 is a longitudinal sectional view through the apparatus as indicated by the line 8—8 of Fig. 6;

Figure 4:
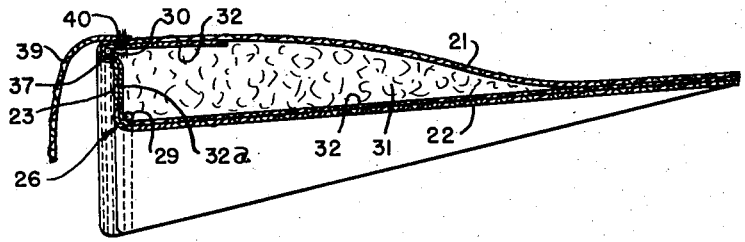
Fig. 4 is a longitudinal central sectional view through the pad.

Figs. 9 to 16 inclusive, are views illustrating successive steps of the method of making the pad;

Fig. 17 is a side view of an alternative apparatus or fixture embodying the invention;

Fig. 18 is an end view of the same, looking at the device from the right, as shown in Fig. 17;

Figs. 19 to 22 inclusive, are views illustrating steps in the making of the pad with jig shown in Figs. 17 and 18; and Fig. 23 is a fragmentary side view of a portion of said jig showing an insert which may be used to make pads having a modified corner contour.

Referring first to Figs. 1 to 4 inclusive, the shoulder pad comprises a top wall 21, a bottom wall 22, and an end wall 23, said walls being provided from a single piece of fabric material. The walls 21 and 22 conform to a pair of arcuate surfaces of approximately conical shape, intersecting along the lines 24, and flaring from a common apical point, indicated at 25, toward their spaced end extremities which join the end wall 23 to define the corners 26 and 27 respectively. The end wall 23 is substantially flat and is in relatively abrupt relation to the top and bottom walls 21 and 22, i. e., with the corners 26 and 27 fairly sharply defined. The end wall 23 has a shape which may be described as being generally meniscoid, and terminates at the meniscoidal points 28. The corners 26 and 27 are reenforced by a pair of tension members 29 and 30 respectively, which cooperate to preserve the desired meniscoidal shape of the end wall 23. The members 29 and 30 are shown as being of cord, which will not stretch when placed under tension. A body or wad of material having some resiliency, such as cotton (in the natural state after ginning), is used as a filler, the expansive force of the filler maintaining the cover walls distended in a smoothly rounded shape which, cross-sectionally, is faithfully maintained in the meniscoid form, particularly at the end wall 23, by the reenforcing tension elements 29 and 30. In thus functioning, the upper cord 30 is distended by the expansive force of the filler 31 and also by the stiffness of the end wall itself (which is reenforced by a lining of stiffened fabric, as will be pointed out more in detail hereinafter), and the lower cord 29 acts in tension to resist spreading of the meniscoidal points 28 under a certain amount of spreading force which arises from a natural tendency of the pad to flatten out, and which resists any other forces tending to spread the points 28.

Interposed between the bottom wall 22 and the filler 31 is a sheet of stiffened fabric 32. The sheet 32 may comprise a sized, open-mesh fabric such as crinoline, which, when wet, adheres to the cords, cover, and also to the filler material. When this fabric is wet, it can be readily shaped, and after drying while remaining in such shaped condition, it cannot be readily deformed from that dried shape, and will not stretch.

Figure 2:
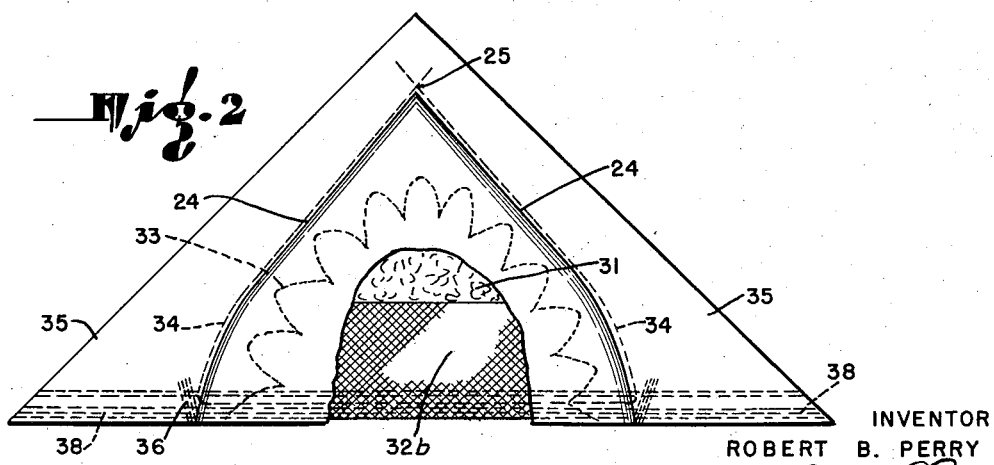
Fig. 2 is a plan view of the same with a portion of the cover material broken away to illustrate the interior of the structure.

The sheet 32 is extended around the lower reenforcing cord 29 and upwardly against the inner face of the end wall 23, as indicated at 32a, thence around the upper reenforcing cord 30 and then back beneath the upper cover wall 21 as indicated at 32b. The portion 32b may comprise a narrow strip, just sufficient to provide for secure attachment to the upper reenforcing cord 30, but is preferably a fairly wide strip, as indicated in Fig. 2, and may, if desired, be coextensive in area with the upper wall 21. The cover is of a soft material, such as flannel or felt, with very little tensile strength, but which will stretch, as will be described hereinafter. The reenforcing sheet 32, although of open mesh material, is fairly resistant to stretching, and is provided with some stiffness by the sizing therein, which, in connection with the reenforcing cords 29 and 30, maintains the pad in the desired shape. Further assistance in retaining the preformed shape is provided by scalloped lines of jump-basting 33 in the marginal area of the padded portion of the pad. The side margins of this padding or body portion of the pad, along the line 24, are secured by lines of stitching 34. Marginal portions of the cover walls 21 and 22 project beyond the lines of stitching 34 to define sewing flanges 35. Some of the reenforcing sheet material 32, 32b, may also project into the flanges 35.

The reenforcing cords 29 and 30 are very securely anchored at the meniscoidal points 28 by lines of stitching 36 extending from the forward edges of the flanges 35 part way into the flanges and transversely of the reenforcing cords. This prevents the cords from slipping with reference to the cover material and with reference to each other.

The web portion of the material of the cover and reenforcing sheet, extending around the upper reenforcing cord 30, is folded back upon itself to form a sewing flange 37 which is disposed as a projection of the top 21 overhanging the end wall 23. This flange is secured by a line of stitching 38 securing the folded portions together between the cord 30 and the plane of the end wall 23. The flange 37 provides a means whereby the pad may be readily and accurately sewed to the fabric of the garment, as indicated in Fig. 4 at 39, and a line of stitching securing the pad to the garment fabric is indicated at 40, and the remainder of the marginal area or flange 35 of the pad may be secured to the garment by suitable stitching.

The overhanging flange 37 provides an abrupt edge over which the outer covering material of the garment may be draped in a fashion that is considered highly desirable in the clothing trade. As far as I am aware, no one previous to my invention has achieved this sharp corner effect, particularly by means of an overhanging sewing flange or the like, which also facilitates fastening of the pad to the garment.

Referring now to Figs. 5, 6, 7 and 8 for a showing of one form of apparatus or fixture for making the pads embodying my invention, I provide a pair of form sections 41 and 42. The form section 41 comprises an end member 43 having an arcuate flange 44 to which is secured a perforated apron 45 which may be of sheet metal, or which may be cast, or the like. The member 43 is fixed, as by bolts 46, to a post 47 which is secured to a base 48. The form section 42 may be formed as an integral casting, or of sheet metal, with a curved apron portion 49 and an end wall portion 50 having a downward extension 51 which is provided with a slot 52 to receive a bolt 53 mounted in the post 47. The extension 51 is slidably mounted between guideways 54 and is provided with an aperture 55 to receive the end of a lever 56 by means of which the form section 42 may be elevated and lowered. The member 43 and the end wall portion 50 are flat surfaced with the flat surfaces lying in planes at right angles to the axes of the aprons 41 and 49. By means of this lever 59 the upper surfaces of the aprons 41 and 49 may be positioned in registry so that together they define a continuous curved surface around a common axis. Also the apron 49 may be shifted upwardly so that its surface is in a plane substantially parallel to the surface of the apron 41, and is joined thereto by the exposed flat wall area 50a, which defines the meniscoid area referred to in the foregoing. The end wall portion 50 is provided with a series of perforations 50b which, with the perforations in the apron 41, allow steam to escape from the pad during the heat treatment, which will be further referred to hereinafter.

The lever 56 is mounted on a pivot 57 carried by a bracket 58 extending from the base 48, and said lever has a handle 59. A latch 60, having a plurality of teeth 61, is pivoted at 62 to the base and is urged by a tension spring 63 into engagement with a finger 64 on the lever 56. A plurality of scale marks 65 on the latch 60 indicates the height that the form section 42 is elevated above the form section 41, and thereby indicates the height of the end wall wall 23 of the pad that is fabricated on the apparatus or fixture.

A pair of U-shaped brackets 66 are secured to the base 48 and project upwardly, and a pair of side wall members 67 are secured to the bracket members 66. Mounted in the wall members 67 are a plurality of downwardly inclined pointed pins or carding hooks 68, to which the side extremities of sheets of material, stretched over the form sections 41 and 42 are secured.

In the apron 49 of the form section 42 are several grooves 69 adapted to accommodate and position the upper reenforcing cord 30. The two cords 29 and 30 are stretched over the form sections and their lower ends, at one side, are secured to a key 70 which is rotatable in a socket 71 in a block 72 secured to the base 48, in order to tighten the cords across the forms. The opposite ends of the cords may be joined together and looped around a hook 73 anchored in the base 48.

The apron 45 is provided with a large number of perforations 74 which permit the escape of steam from the pad during the heat treatment.

Referring now to Figs. 9 to 16 inclusive, which illustrate the steps of the process, a sheet 81 of cover material, generally of diamond shape, folded between its side corners, is stretched over the form section 41 with the fold coinciding approximately with the plane of division between the sections 41 and 42, as shown in Fig. 9. To facilitate the positioning of the cord lines, the apron 49 may be positioned in an elevated position, as shown in Fig. 5, for example, to cause the surface 50a to form a stop for the fold line of the fabric. The side corners of the inside fold of the cover fabric are then pressed against the carding hooks 68 to which they will readily cling as a result of the downward inclination of the hooks. The movable form section 42 is then lowered to a position in alignment with the section 41, if it has not already been lowered to that position. The folded-over portion of the cover sheet 81 is then peeled back and stretched across the apron 49 of the movable form 42, as illustrated in Fig. 10, the side corners of the sheet remaining impaled upon the carding hooks 68.

A smooth surfaced spoon or shoe 92 roughly semi-cylindrical in shape and of thin, fairly stiff sheet material, is then placed over the half of the cover sheet which lies upon the apron 45, the end of the spoon being disposed closely adjacent the plane of the division between the two form sections. The handle 59 is then pushed downwardly to elevate the form section 42, thus offsetting the free portion of the cover sheet upwardly, as indicated in Fig. 11. This operation forms the offset meniscoidal area or end wall 23 of the cover. The lever 56 is locked by the latch 60 in the appropriate position to determine the desired height of offset 83 in the cover sheet. In this step the cover sheet is stretched, the felt material yielding sufficiently to form the offset.

A roughly triangular shaped sheet of reenforcing fabric 84, such as crinoline or other suitable material, is then placed over the cover sheet 81, with the base portion of the reenforcing sheet stretched around the apron 49 and overlapping the offset 83, and with the apex of the triangle near a corner of the depressed portion of the cover sheet 81. This depressed portion forms the bottom wall 22 of the pad, the top wall 21 comprising the portion disposed over the movable form section 42, and the end wall being substantially the offset portion 83. The disposition of the reenforcing material above described is shown in Fig. 12.

Before or after the placement of the reenforcing sheet, the shoe 82 is withdrawn.

Reenforcing material 84 is moistened before being applied over the cover in order to soften the sizing therein and after being applied, as shown in Fig. 12, it is stretched to the shape shown in Fig. 13 by application of the reenforcing cords 29 and 30. With the cord 30 disposed over crinoline material, said cord is drawn down into whichever one of the grooves 69 is selected so as to secure the overlapping edge portion of the reenforcing sheet in position. With this edge portion of the sheet thus secured, the cord 29 is pulled down over the reenforcing sheet and into the corner at the base of the offset 83, thus bringing said reenforcing sheet into conformity with the shape of the cover sheet, as shown in Fig. 13.

The ends of the cords 29 and 30 are then appropriately anchored under tension, as by means of coil springs 87, or by means of the keys 70 previously described.

A semi-pyramidal body of filler 88 is then placed upon the reenforcing sheet with its base end 88a, which is cut flat, abutting the offset 83, as shown in Fig. 14. That is, the base is positioned so as to engage the face of the area of crinoline at 32a. As previously stated, I employ a filler having some resiliency, and find that gin cotton is suitable for the purpose. The side regions of the body 88 are draped downwardly around the apron 45 as indicated.

The spoon or shoe 82 is then placed over the filler body and pressed downwardly to shape the upper surface of the filler body to a smoothly rounded contour. With the shoe thus pressed downwardly against the filler, the top wall 21 of the cover sheet is then peeled back from the form section or apron 42 and is laid over the shoe 82 as shown in Fig. 15. This top wall section is stretched as far toward the corner of the lower wall 22 as is permitted by the reenforcing cord 30 which prevents further peeling. This operation results in the formation of the flange 37 (Fig. 4) and lays back the crinoline material margin 32b, thereby confining the filler body 31 as the portion 21 is stretched somewhat to its final position. If desired, the rightward edge of the spoon 82 may during the peeling operation project to a point abutting the cord 30 to prevent the cord from being displaced as said cover and reenforcing material are being peeled back. A sheet of fabric 89 is then placed over the pad so as to hold down the top wall 21 while the shoe 82 is withdrawn, as shown in Fig. 16. The fabric sheet 89 is then tightened by pulling it downward and securing same on the carding hooks, said sheet 89 remaining in place while the moisture is dried out of the crinoline material, giving it a set. This drying step is not illustrated in the drawing, but may comprise a conventional drying operation in an oven or the like.

The lines of stitching 36 which secure the reinforcing cords under tension are applied promptly after the pad is removed from the form, the operator being careful to handle the pad during removal so as to prevent displacement of the cords within the pad. The lines of stitching 34, and the jump basting 33 are then applied by means of a suitable sewing machine, and after any desired trimming operation has been performed. The pad is then ready for use.

Referring to the apparatus or fixture shown in Figs. 17 and 18, there is shown an alternative device for making, in accordance with the present method, shoulder pads. This fixture comprises a base 100, embodying the invention disclosed in the above referred to copending application, constituting a flange of an upstanding wall 103, as shown in said Figs. 17 and 18. A bracket 104 is attached to one side of the wall 103 by means of bolts, not shown, which pass through an end wall 105 of said bracket. The bracket 104 has a pair of oppositely disposed wall-like arms 106 which extend laterally of the end wall 105, and are laterally spaced apart from each other, said arms 106 being positioned at the respective opposite sides of the device. Each arm 106 has oppositely arranged grooves 107 adjacent their longitudinal sides, which extend longitudinally of the arm and receive the edge portions of a strip of composition material 108 in which the pins or carding hooks 68 are molded or set, and which serve as means for securing or anchoring parts of the pad during their manufacture, as will be more fully brought out hereinafter. It is to be understood, of course, that the hooks 68 may be otherwise mounted.

The upper end 109 of the wall 103 is rounded or arcuate in shape, as best shown in Fig. 18, and generally conforms to the curvature of the adjacent end of the apron or section 41 which is of general arcuate shape in cross section. The apron 41 extends laterally of the wall 103 and on the same side thereof as bracket 104, said apron being disposed above the bracket. Any suitable means for securing the apron to the wall 103 may be employed, such as bolts, or the like, not shown. It is to be noted that the apron 41 is shown in Figs. 17 and 19 to 23, as being inclined at an obtuse angle to the wall 103, although it may be otherwise positioned, depending on the type of pad to be made.

On the side of the wall 103 opposite the apron, is a plate 111 which is slidably mounted on said wall by means of a bolt 112 which passes through a slot 113 extending longitudinally of said plate 111, there being a washer 114 disposed beneath the head 115 of said bolt. The plate 111 has oppositely disposed notches 116 adjacent the bottom end, to provide a depending tongue 117 which has an outwardly extending flange 118 for a purpose to be hereinafter described. The inner face of the plate 111 is provided with a longitudinally extending groove 119 in which is received a flange 120 which projects outwardly from the adjacent face of the wall 103 and which serves as longitudinal guide means for said plate.

Adjacent the upper end of the plate 111 are a plurality of holes 121 which extend through said plate and are arranged arcuately in spaced relationship to each other for reception of the inner end of a plunger 122 which extends through an enlarged boss 123 of a lever 124. The boss 123 is adjacent the free end of the lever 124 and the opposite end of said lever is pivotally mounted on a bolt 125, carried by the plate 111, said lever being secured on the bolt by means of a wing nut 126. The lever 124 is provided with a recess 124a at its inner side so as to clear the head 112a of the bolt 112.

The boss 123 has a recess 127 within which is received a spring 128 which reacts against the outer end wall 129 of said recess and a flange 130 on said plunger, for urging the latter inwardly of said holes 121. The outer end of the plunger is provided with a knurled knob 131 which is secured thereto by a nut 132.

The holes 121 are arranged in the arcuate path of the plunger 122, and the wall 103 is provided with a plurality of recesses or holes 133 which are spaced apart along lines which extend upwardly and inwardly from the sides of said wall and intersect adjacent the longitudinal center of the wall. The holes 133 are located in the path of the respective holes 121, the purpose of this arrangement being to provide means for adjustably positioning the plate 111 with respect to the wall 103 and to secure said plate in various adjusted positions with respect to the wall 103.

The upper end of the plate 111 is provided with a generally rounded boss or skirt or form section 134 conforming to the curvature of the upper end of the wall 103 and having an arcuate flange 135 adjacent its lower edge. More specifically, the skirt 134 curves outwardly of the inner side of the plate 111, as best shown in Fig. 17.

Means for quickly clamping a member, such as the cord 29 or the like, is provided at each side of the wall 103, said clamps being shown as disposed adjacent the lower end of the wall and below the bracket 104. Each clamp comprises a lever 137 which is pivoted on a screw 138 received in a flange 139, which may be a piece secured to the wall 103 but is shown as being integral therewith, said flange extending laterally of the wall on the same side thereof as the bracket 104. The lever 137 is pivoted adjacent one end thereof and said end is knurled, as at 139, for clamping the member or cord 29 against the adjacent face of a flange 141 of the wall 103. The last mentioned flange extends at right angles to the flange 139 and is shown as being formed integral with the wall although it may be a separate piece secured to the wall by any suitable well known means. The wall 103 has slots 142 therein adjacent the flanges 139, so that the screws 138 may be secured by nuts 143, as shown in Fig. 18. If desired, screws 144 may be screwed into threaded holes in the flanges 139 so that the heads thereof serve as limiting stops relative to the clockwise movement of the levers 137, as viewed in Fig. 17.

In making shoulder pads with the fixture shown in Figs. 17 and 18, the plate 111 is disposed at its lowermost position whereat the upper end thereof is in alignment with the upper end of the wall 103, similarly to the arrangement shown in Figs. 9 and 10 of the first described apparatus or fixture. A sheet of cover material, cut in the general shape of a diamond, is disposed on the form or apron 41 in a manner similar to that shown in Fig. 10. That is, the part of the cover material which will constitute the lower or bottom wall 22 of the finished pad is disposed on the apron, with the remaining portion extending beyond the skirt 134. The depending corner portions of the sheet of cover material are attached to the hooks 68 so as to firmly hold the material in position. A spoon or shoe, such as shown at 82 in Fig. 11, or at 150 in Fig. 21, is placed over that part of the cover material lying on the apron 41, as shown in Fig. 11, with the righthand end of said spoon closely adjacent the plane of the lefthand side or wall 50a of the plate 111. Thereafter, the plate 111 is raised to the desired position, which is determined by the position of the adjusting lever 124. Any suitable means may be employed for raising the plate 111, as by engagement of the flange 118, by a suitable lever mechanism, not shown. Simultaneously with the raising of the plate 111, there is an offset or shoulder 83, formed from a portion of the cover material, and which constitutes the end wall of the cover of the finished pad.

The next step in the forming of the shoulder pad by the present method comprises the placing of a dampened or moistened piece or sheet of reenforcing material, such as crinoline, over the cover material, and by forming a crease or fold therein the crinoline is provided with a shoulder 151 which fits against the shoulder portion of the cover as shown in Fig. 19, a portion of the sheet of crinoline extending over the outwardly projecting part 21 of the cover which constitutes the top wall of the finished pad; that is, the crinoline is substantially coextensive with the sheet of cover material. The cover and the reenforcing material are then secured to the fixture adjacent the junction of the lower wall and end wall of the shoulder pad by suitable means which, as shown, comprises the tension cord 29 which is disposed as shown in Fig 19 and which has its end portions secured by the clamping means which includes the lever 137 and the flange 141, as best shown in Fig. 17. After the cord or tension member 29 is secured in place, the filler 88 is placed over the crinoline reenforcing sheet as shown in Fig. 20. The spoon 150 is then pressed down over the filler material which is thereby compressed, and the laterally extending portions of the reenforcing material and cover are folded back over the spoon, as shown in Fig. 21, after which the spoon is withdrawn longitudinally from the pad.

The pad is then compressed by suitable means, preparatory to heating or baking same in an oven, which means is shown as a piece of heavy fabric 152, of canvas or the like. The side portions of the fabric 152 are then secured on the hooks 68 after said fabric has been drawn down sufficiently.

In order to prevent undue compression of the pad a strip of resilient metal 153 is provided on the upper surface of the piece of fabric 152 and is disposed in a pocket formed by a strip of fabric 154 which is sewed to the piece of fabric 152. It will be noted that the metal strip 153 extends longitudinally of the control portion of the pad from a point adjacent the left hand end thereof, as shown in the drawings, and slightly overlies the adjacent end of the skirt 134.

The fixture, with the formed pad, is then placed in an oven and heated or baked for a suitable length of time. Various means for passing the fixture and pad into and out of an oven may be employed. In the arrangement shown in Fig. 17, the flange 100 is secured to a member 101 by means of a bolt 102, said member 101 in turn being secured to a belt or chain, not shown, which runs through an elongated oven, not shown, so that the fixture carrying the pad will be carried therethrough, and the pad suitably heated during the time it is within the oven. Of course other means may be employed for subjecting the pad to the heat treatment. After the baking or heat treatment, the pad is removed from the fixture, this being done by first removing the piece of fabric 152 from the hooks 68 and then similarly removing the pad which is thereafter trimmed and sewed. The wall 111 is then moved to its lowermost position, after first releasing the plunger 122, and the fixture is then ready for making the next pad.

Pads made according to the above described method have a relatively square upper corner. However, this corner may be rounded by the use of a suitable inset 155, as shown in Fig. 23. This inset is crescent shaped when viewed from the side, and is generally triangular in cross-section, one side 156 being flat and adapted to be positioned against the adjacent wall portion of the plate 111. The opposite side of the inset is rounded, as at 157, so that the upper corner of the formed pad will be correspondingly rounded. This inset is placed in the position shown in Fig. 23 after the pad has been formed and the spoon 150 removed, but prior to the attachment of the piece of fabric 152.

It is to be understood of course, that the end wall and upper corner of the pads may be otherwise shaped by using insets of other characteristics.

Figure 1:
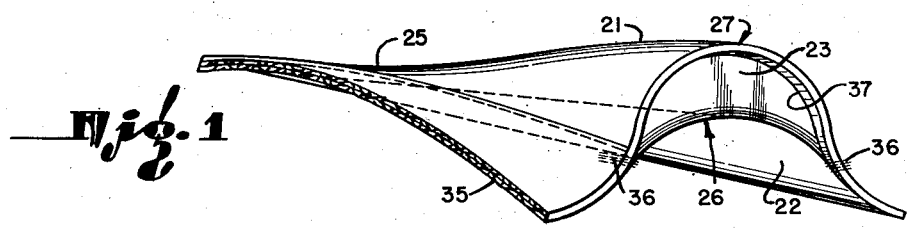
Fig. 1 is a perspective view of a shoulder pad embodying the invention.
Figure 3:
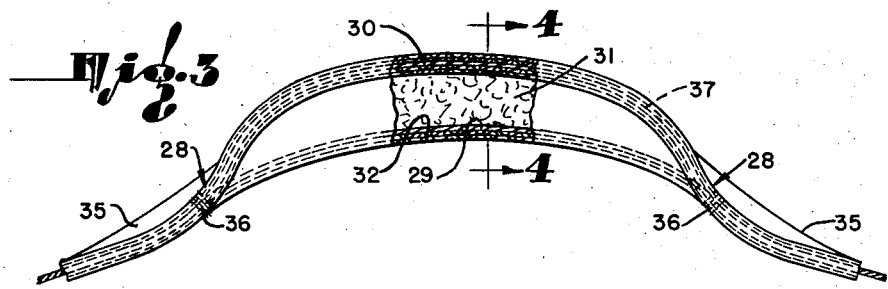
Fig. 3 is an end view of the pad with a portion of the end wall broken away to illustrate particularly the reenforcing cords.

Further, if it should be desired to make a pad having a rounded overhanging flange, somewhat larger than that shown in Figs. 1 and 4, such a pad may be made with the apparatus shown in Figs. 17 and 18 by using a member, such as the tension cord 30. This cord 30 is used to secure the cover and reenforcing fabric to the skirt 134 by passing said cord over the cover and reenforcing material so as to secure same to the flange 135 of said skirt 134 and adjacent said skirt, as at 160. The method of making the pads is otherwise the same as hereinabove described.

While the members 29 and 30 have been shown and described as being cords, it is to be understood that either or both of these members may be of wire, for example, and that if desired, either or both of the members may be removed from the pad after it has been heat treated. Of course, when pieces of cord are used and left in the pad, said pieces of cord reenforce the pad and help maintain it in the desired shape.

Further, the invention is applicable to any garment adapted to cover the torso and shoulders of a human body, such as suit jackets or coats, overcoats, blouses, dresses, kimonos, etc.

It will be observed from the foregoing description of the process of assembling the parts of the pad that no stitching operations have been necessary and that the pad is completely formed by a process of folding and operation of the tool.

I claim:

1. The steps in a method of making a shoulder pad for garments, comprising: stretching a sheet of cover fabric around a form having an upper surface arcuate in transverse cross section and divided transversely in intersections; anchoring the side extremities of the sheet to maintain the stretched condition; elevating one section of the form while restraining the cover sheet in contact with another section of the form whereby to produce an offset in a central region of the sheet, which is generally meniscoidal; applying a dampened sheet of sized reenforcing fabric in a position bridging the raised portion of the cover sheet to the depressed portion of the cover sheet remote from the offset; drawing a pair of flexible reenforcing elements under tension across the reenforcing sheet at the crest and at the base of the offset respectively so as to confine the reenforcing sheet upon the crest of the offset and draw the intermediate region of the reenforcing sheet down to the base of the offset; anchoring said reenforcing element to hold the reenforcing sheet in the position thus obtained; applying a body of filler upon the depressed portion of the reenforcing sheet and abutting the offset; shaping the upper surface of the body of filler by pressing a thin shoe of arcuate shaped sheet material downwardly thereagainst; folding back that portion of the cover sheet which is supported upon the raised form section over said shoe; withdrawing the shoe while confining said folded over portion of the cover sheet downwardly against the filler and the projecting edge portions of the reenforcing sheet and cover; and securing the parts in the positions thus attained.

2. A method of making a shoulder pad for garments, comprising: disposing a sheet of cover fabric on the forming surfaces of a form divided into sections; actuating one section of the form relative to the other section, while restraining the cover sheet in contact with the other section, to thereby produce an offset in a region of the sheet intermediate the ends thereof; applying a sheet of reenforcing fabric in a position generally overlying the cover material and conforming to the shape thereof; securing a retaining member over the reenforcing sheet adjacent the base of the offset; applying a body of filler upon that portion of the reenforcing sheet disposed on said other section, and abutting the offset portion; placing a spoon over the filler and applying pressure thereto; folding back over the spoon those portions of the cover sheet and reenforcing sheet which extend beyond the offset; and withdrawing the spoon.

3. A method for making a shoulder pad for garments, comprising: disposing a sheet of cover fabric on the forming surfaces of a form divided into sections; actuating one section of the form relative to the other section, while restraining the cover sheet in contact with the other section, to thereby produce an offset in a region of the sheet intermediate the ends thereof; applying a sheet of reenforcing fabric in a position generally overlying the cover material and conforming to the shape thereof; securing a retaining member over the reenforcing sheet adjacent the base of the offset, applying a body of filler upon that portion of the reenforcing sheet disposed on said other section, and abutting the offset portion; placing a spoon over the filler and applying pressure thereto; folding back over the spoon those portions of the cover sheet and reenforcing sheet which extend beyond the offset; withdrawing the spoon; and securing the parts in the described positions on the form section.

4. In a method of making a shoulder pad for garments, comprising: disposing a sheet of cover fabric on the forming surfaces of a form divided into sections; actuating one section of the form, while restraining the cover sheet in contact with the other section, to thereby produce an offset in a region of the sheet intermediate the ends thereof; applying a dampened sheet of sized reenforcing fabric over the cover sheet in substantial conformity with the shape of said cover sheet; securing a restraining member over the reenforcing sheet adjacent the base of the offset; applying a body of filler upon the depressed portion of the reenforcing sheet and abutting the offset portion; placing a spoon over the filler and applying pressure thereto; folding back over the spoon those portions of the cover sheet and reenforcing sheet which extend beyond the offset; withdrawing the spoon; securing the parts in the above described positions on said other form section; and subjecting the formed pad to heat.

5. The invention defined by claim 4 and including removal of the pad from the form after it has been subjected to heat; and trimming the edges of said pad.

6. The invention defined by claim 4, including removal of the pad from the form section after it has been heat treated; trimming the edges of the pad; and sewing portions of the pad together.

7. The invention defined by claim 4, including the removal of the pad from the form section after the heat treatment; and sewing sections of said pad together.

8. In a method of making a shoulder pad for garments, comprising: disposing a sheet of cover fabric on the forming surfaces of a form divided into sections; actuating one section of the form, while restraining the cover sheet in contact with the other section, to thereby produce an offset in a region of the sheet intermediate the ends thereof; applying a dampened sheet of sized reenforcing fabric over the cover sheet in substantial conformity with the shape of said cover sheet; securing a restraining member over the reenforcing sheet adjacent the base of the offset; applying a body of filler upon the depressed portion of the reenforcing sheet and abutting the offset portion; placing a spoon over the filler and applying pressure thereto; folding back over the spoon those portions of the cover sheet and reenforcing sheet which extend beyond the offset; withdrawing the spoon; securing the parts in the above described positions on said other form section; placing a sheet of fabric over the pad; securing the last mentioned piece of fabric so as to place the pad under compression; and subjecting the formed pad to heat.

9. In a method of making a shoulder pad for garments, comprising: disposing a sheet of cover fabric on the forming surfaces of a form divided into sections; actuating one section of the form, while restraining the cover sheet in contact with the other section, to thereby produce an offset in a region of the sheet intermediate the ends thereof; applying a dampened sheet of sized reenforcing fabric over the cover sheet in substantial conformity with the shape of said cover sheet; securing a restraining member over the reenforcing sheet adjacent the base of the offset; applying a body of filler upon the depressed portion of the reenforcing sheet and abutting the offset portion; placing a spoon over the filler and applying pressure thereto; folding back over the spoon those portions of the cover sheet and reenforcing sheet which extend beyond the offset; withdrawing the spoon; securing the parts in the above described positions on said other form section; placing a sheet of fabric over the pad; securing the last mentioned piece of fabric so as to place the pad under compression; protecting the pad against undue compression by the last mentioned piece of fabric; and subjecting the formed pad to heat.

10. The steps in a method of making a shoulder pad for garments, comprising: stretching a sheet of cover fabric around a form having an upper surface arcuate in cross section and divided transversely into sections movable relative to each other; anchoring the side extremities of the sheet to maintain the stretched condition; elevating one section of the form while restraining the cover sheet in contact with the other section of the form to produce an offset in a central region of the sheet, said offset being generally meniscoidal; applying a dampened sheet of sized reenforcing fabric in a position bridging the raised portion of the cover sheet to the depressed portion thereof; drawing a flexible reenforcing element under tension across the reenforcing sheet at the base of the offset so as to confine the reenforcing sheet against the cover sheet and to draw the intermediate region of the reenforcing sheet down to the base of the offset; anchoring said reenforcing element to hold the reenforcing sheet in said position; applying a body of filler upon the depressed portion of the reenforcing sheet and abutting the offset; shaping the upper surface of the body of the filler by pressing a relatively thin shoe of arcuate shape in cross section downwardly thereagainst; folding back over said shoe that portion of the cover sheet which is supported upon the raised form section; withdrawing the shoe while confining said folded portion of the cover sheet downwardly against the filler and the projecting edge portions of the reenforcing sheet and cover; and securing the parts in said positions.

11. A method of making a shoulder pad for garments, comprising: disposing a sheet of cover fabric on the forming surfaces of a form divided into sections; holding the portion of the sheet on one of the form sections; actuating the other section to thereby produce an offset in a region of the sheet intermediate the ends thereof; applying a sheet of reenforcing fabric generally conforming to the shape of the cover material; securing a retaining member over the reenforcing sheet adjacent the base of the offset; applying a body of filler over a portion of the reenforcing sheet; placing a spoon over the filler and applying pressure thereto; folding back over the spoon a portion of the cover sheet and reenforcing sheet; and withdrawing the spoon.

12. The invention defined by claim 11, including insertion of an inset between the face of the actuated form section and the pad after the spoon has been withdrawn; compressing the pad to a limited extent; and subjecting the pad to heat.

13. The steps in a method of making a shoulder pad for garments, comprising: stretching a sheet of cover fabric over a form having an arcuate surface in cross section and divided transversely into sections; anchoring the side extremities of the sheet; moving one of the sections of the form while restraining the cover sheet in contact with the other section to stretch an offset in said sheet intermediate its ends, the portion offset being generally meniscoidal in shape; applying a sheet of reenforcing fabric over the cover sheet; drawing a pair of elongated restraining elements across the reenforcing sheet adjacent the crest and at the base of the offset respectively; anchoring said reenforcing elements; applying a body of filler adjacent the offset part of the sheets; arcuately compressing the filler; folding back that portion of the cover sheet from the moved form section; and securing the parts in said position.

14. A method of making a shoulder pad for garments, comprising: securing a sheet of cover fabric on a form having a surface arcuate in cross section and divided transversely into sections; moving one section of the form while holding the cover sheet in contact with the other section to produce an offset in an intermediate region of the sheet, which offset is generally meniscoidal in shape; applying a sheet of reenforcing fabric over the cover sheet; drawing a reenforcing element over the reenforcing sheet at the base of the offset; securing said reenforcing element; adding filler material with a portion abutting the offset; arcuately compressing the filler; folding back those portions of the cover sheet and reenforcing sheet which extend beyond the offset; and securing the parts in the folded position.

15. A method of making a shoulder pad for garments, comprising: disposing a sheet of cover fabric on the forming surfaces of a form divided transversely into sections; holding a portion of the sheet on one of the form sections; actuating the other section to thereby produce an offset in an intermediate region of the sheet; applying a dampened sheet of sized reenforcing fabric over the cover material; securing a retaining member over the reenforcing sheet adjacent the base of the offset; applying a body of filler over a portion of the reenforcing sheet; pressing a thin member over the filler; folding back over said thin member that portion of the cover sheet which is free of said member; and withdrawing said member.

16. A method of making a shoulder pad for garments, comprising: securing a sheet of cover fabric on a form having a surface divided transversely into sections; actuating one of said sections of the form while restraining the cover sheet in contact with the other section of the form to produce an offset in an intermediate region of the sheet; applying a sheet of reenforcing fabric over the cover sheet; securing a pair of restraining elements across the reenforcing sheet adjacent the crest and at the base of the offset respectively; applying a body of filler adjacent the offset portion of the reenforcing sheet; compressing the filler; and folding back those portions of the cover sheet and reenforcing sheet which extend beyond the element at the crest of the offset.

17. A method of manufacturing a shoulder pad for garments, comprising: disposing a sheet of cover material on the forming surfaces of a form divided transversely into sections; displacing the sections so as to produce an offset in said sheet intermediate its ends; adding a body of filler onto one portion of the sheet; and folding over and drawing a portion of the cover sheet on one of the form sections into overlapping relations with the other portion of said cover sheet.

18. A method of forming a shoulder pad for garments, comprising: disposing a sheet of cover material in an extended shaped position; forming an offset in said cover sheet in a region intermediate its ends to provide an end wall for the completed pad; placing a dampened sheet of sized reenforcing material over the cover sheet in conformity with the contour thereof; placing filler material on one part of the reenforcing material adjacent the offset; and folding the cover sheet and reenforcing material on one side of the offset back over the portions of said sheet and material on the other side of the offset.

19. A method of making a shoulder pad covering which comprises: providing a diamond shaped piece of covering fabric; folding the fabric once along the diagonal line joining the near corners, fastening the folded piece with the fold line in register with the adjoining edges of a two part form and one portion of the fabric piece snugly engaging one part of the form; unfolding the piece of fabric onto the balance of the form; applying a spoon in restraining relation to the first portion of the fabric while stretching the other portion of the fabric in a direction normal to the surfaces to provide an offset; applying a moistened piece of reenforcing material with its edge overlying the second portion of the first piece of covering fabric adjacent the offset; applying an inelastic member to the reenforcing material and the cover fabric at one side of the offset and tightening said member to prevent slippage of the fabric and reenforcing material; drawing a second inelastic member against the reenforcing material at the opposite side of the offset to form an offset in the reenforcing material and bring the balance of the reenforcing material into contact with the surface of the first piece of fabric; applying a body of filler having a square end, with said end abutting the offset area of the covering; applying a spoon to the filler material to compress it below the offset edge; and drawing the second portion of the covering fabric over the first portion until stopped by the first mentioned inelastic member.

20. A method of making a shoulder pad covering which comprises: providing a diamond shaped piece of covering fabric; folding the fabric along a diagonal line between opposite corners, fastening the folded piece with the fold line in register with the adjoining edges of a two part form, one portion of the fabric piece snugly engaging one part of the form; unfolding the piece so that the unfolded portion is disposed on the other part of the form; applying a spoon in restraining relation to the first portion of the fabric while displacing the other portion of the fabric in a direction normal to the surfaces to provide an offset; applying a moistened piece of reenforcing material on the piece of covering fabric; applying an inelastic cord to the reenforcing material and the cover fabric adjacent one side of the offset and tightening the cord to prevent slippage of the fabric; drawing a second cord against the reenforcing material adjacent the other side of the offset to thereby form an offset in the reenforcing material conforming to the offset in the cover fabric; applying a square ended body of filler with said square end abutting the offset of the covering; applying a spoon to the filler material to compress it below the offset edge; drawing the second portion of the covering fabric over the first portion until stopped by the first mentioned cord; withdrawing the spoon; drying the pad thus far assembled while it remains on the form; removing the pad from the form; stitching the cords in position in the fabric; sewing the edges of the pad cover together; and sewing the first cord in place to define a sewing strip.

21. A method of making a shoulder pad for garments, comprising: fastening a piece of cover fabric over arcuate form surfaces of a form divided transversely into sections; forming an offset in said cover fabric by displacement of one of the sections so as to provide a meniscoidal wall intermediate the ends of the fabric; applying a moistened reenforcing sheet of crinoline over the cover fabric in conformity with its contour; securing the crinoline and cover fabric against the surface of the form adjacent the base of the offset; applying a body of filler adjacent the offset; folding into overlapping relationship the portions of the cover fabric and crinoline on opposite sides of the offset; compressing the pad; and subjecting said pad to heat.

22. In a method of manufacturing shoulder pads for garments, the steps of: disposing a sheet of cover material on the forming surface of a form and securing side portions of the same under tension; stretching a moistened sheet of sized reenforcing fabric over the cover sheet and securing side portions of said reenforcing fabric under tension, said reenforcing fabric being of an open weave and having relatively stiff, shape retaining characteristics when dry, the moistening of said fabric being adapted to soften the sizing and permit the sheet to conform to the desired finished shape and to also cause the sizing to adhere to material in contact with said reenforcing material when dried; placing filler material on one part of the reenforcing material; placing a spoon over the filler material and applying pressure thereto, one end of said spoon being disposed adjacent to one edge of the filler material; folding a portion of the cover sheet and reenforcing sheet back over said spoon to a point limited by said spoon end; removing the spoon; securing side portions of the folder sheets under tension; and subjecting the pad to heat for drying the reenforcing fabric.

23. The method of manufacturing shoulder pads for garments, the steps of: disposing a sheet of cover material on the forming surface of a form and securing side portions of the same under tension; stretching a moistened sheet of sized reenforcing fabric over the cover sheet and securing side portions of said reenforcing fabric under tension, said reenforcing fabric having relatively stiff, shape retaining characteristics when dried, the moistening of said fabric being adapted to soften the sizing and to permit the sheet to conform to the desired shape and to also cause the sizing to adhere to material in contact with said reenforcing material when dried; placing filler material on one part of the reenforcing material; placing a spoon over the filler material and applying pressure thereto; folding a portion of the cover sheet and reenforcing sheet back over the spoon; removing the spoon; securing side portions of the folder sheet under tension; and subjecting the pad to heat for drying the reenforcing fabric.

24. In a method of manufacturing shoulder pads for garments, the steps of: disposing a sheet of cover material on the forming surface of a form and securing side portions of the same; stretching a moistened sheet of sized reenforcing fabric over the cover sheet and securing side portions of said reenforcing fabric, said reenforcing fabric having relatively stiff, shape retaining characteristics when dry, the moistening of said fabric being adapted to soften the sizing and permit the sheet to conform to the desired finished shape and to also cause the sizing to adhere to material in contact with said reenforcing material when dried; placing filler material on one part of the reenforcing material; placing a spoon over the filler material; folding a portion of the cover sheet and reenforcing sheet back over said spoon; removing the spoon; securing side portions of the folded sheets; and subjecting the pad to heat for drying the reenforcing fabric.

25. In a method of manufacturing a shoulder pad for garments: disposing a sheet of cover material on the forming surface of a jig; placing a dampened sheet of crinoline material over the cover sheet in conformity of the contour thereof; placing filler material on a part of the reenforcing material; and folding a portion of the cover sheet and reenforcing material back over the filler material.

26. In a method of manufacturing a shoulder pad for garments: stretching a sheet of cover material on the forming surface of a form; stretching a dampened sheet of sized reenforcing material over the cover sheet; placing filler material on one part of the reenforcing material; and folding a portion of the cover sheet and reenforcing material back over the filler material, said folded portion being placed under tension.

27. In a method of manufacturing shoulder pads for garments: disposing a sheet of cover material on the forming surface of a form; placing a dampened sheet of sized reenforcing material over the cover sheet; placing filler material on one part of the reenforcing material; placing a spoon over the filler material, and applying pressure thereto; folding back over the spoon, portions of the cover sheet and reenforcing sheet which extend beyond the end of said spoon; and withdrawing the spoon.

28. A method of manufacturing shoulder pads for garments, comprising: disposing a sheet of cover material on a supporting surface; disposing a dampened sheet of sized reenforcing material over the cover sheet; placing filler material on one part of the above arranged sheets of material; and folding a portion of the cover sheet and reenforcing sheet back over said filler material.

29. The invention defined by claim 28 wherein the pad is shaped over a form.

30. The invention defined by claim 28 wherein the pad is stretched over a form and secured thereto for drying in the desired shape.

31. A method of making shoulder pads for garments, comprising: disposing a sheet of cover fabric on the surface of a form; applying a sheet of reenforcing fabric in a position generally overlying the cover fabric and generally conforming to the shape thereof; securing a retaining member across an intermediate part of the above arranged sheet; applying a body of filler upon the reenforcing sheet to one side of but adjacent to said retaining member; folding back over said filler material the portions of said sheets on the opposite side of said retaining member; and removing said retaining member.

32. A method of making shoulder pads for garments, comprising: disposing a sheet of cover fabric on the forming surface of a form; applying a sheet of dampened, sized reenforcing fabric over said cover sheet; securing a retaining member across an intermediate part of the above arranged sheets; applying a body of filler material upon the reenforcing sheet to one side of but immediately adjacent to said retaining member; folding back over said filler the portions of said sheet on the opposite side of said retaining member; subjecting the formed pad to heat; and removing said retaining member from said pad.

33. A method of making shoulder pads for garments, comprising: stretching a sheet of cover fabric on the surface of a form and securing said sheet in the stretched condition; stretching a sheet of dampened, sized reenforcing fabric over the cover sheet; securing a retaining member across an intermediate part of the above arranged sheets; applying a body of filler material upon the reenforcing sheet to one side of but immediately adjacent to said retaining member; placing a spoon over the filler material and applying pressure thereto, one end of said spoon being disposed adjacent to the retaining member with the edge thereof running generally parallel thereto; folding back over the spoon those portions of the cover sheet and reenforcing sheet which extend beyond the above referred to spoon end, said folded back portions being placed under tension and secured adjacent the sides thereof; withdrawing the spoon; subjecting the formed pad to heat; and withdrawing the retaining member.

34. A method of manufacturing shoulder pads for garments, comprising the steps of: disposing a sheet of cover material on a supporting surface; disposing a moistened sheet of sized reenforcing fabric over the cover sheet, said reenforcing fabric being of an open weave and having relatively stiff, shape retaining characteristics when dry, the moistening of said fabric being adapted to soften the sizing and permit the sheet to conform to the desired finished shape and to also cause the sizing to adhere to material in contact with said reenforcing material when dried; placing filler material on one part of the reenforcing material; folding a portion of the cover sheet and reenforcing sheet over the filler material; and subjecting the prepared pad to heat for drying the reenforcing fabric.

35. In a method of manufacturing shoulder pads for garments: disposing a cover sheet and a dampened, sized reenforcing sheet together, said reenforcing sheet being form retaining when dry and being formable when dampened; folding said sheets about a piece of filler material with the cover sheet on the outside; and drying the assembled parts while the same are in engagement with a forming fixture.

36. In a method of making shoulder pads for garments: disposing a sheet of cover material on the forming surfaces of a form divided into sections; holding a portion of the sheet on one of the form sections; actuating the other section to thereby produce an offset in a region of the sheet intermediate the ends thereof; applying a sheet of reenforcing fabric over the sheet of cover material; applying a body of filler over a portion of the reenforcing sheet; folding a portion of the cover sheet and reenforcing sheet over the filler material; and applying a member to the pad at its folded end, said member having a rounded surface disposed adjacent said path to form a rounded end.

37. In a method of making shoulder pads for garments: disposing a sheet of cover material on the forming surfaces of a form divided into sections; holding a portion of the sheet on one of the form sections; actuating the other section to thereby produce an offset in an intermediate region of said sheet; applying a dampened sheet of sized reenforcing fabric over the sheet of cover material; placing a restraining member over said sheets adjacent the offset therein; applying a body of filler over a portion of the reenforcing sheet, folding a portion of the cover sheet and reenforcing sheet over the filler material; and applying a member to the folded end portion to round one edge thereof.

38. In a method of making shoulder pads for garments: disposing a sheet of cover material on the forming surfaces of a form divided into sections; holding a portion of the sheet on one of the form sections; actuating the other section to thereby produce an offset in a region of the sheet intermediate the ends thereof; applying a dampened sheet of sized reenforcing fabric over the sheet of cover material in conformity with the shape thereof; applying a body of filler over a portion of the reenforcing sheet; applying a spoon to the filler material so that one end of said spoon is adjacent one end of said filler material; folding a portion of the cover sheet and reenforcing sheet over the filler material to the limit permitted by said end of the spoon; removing the spoon; and applying a member to the folded end of the pad to form a rounded end.

39. A method of manufacturing shoulder pads for garments, comprising: disposing a sheet of cover material on a supporting surface; disposing a dampened sheet of sized reenforcing material over the cover sheet; placing filler material on one part of the above arranged sheets of material; folding a portion of the cover sheet and reenforcing sheet back over said filler material; stretching the assembled and folded parts onto a forming surface; and applying to the folded end a member having a surface with a configuration such as to round a portion of said end.

40. In a method of manufacturing shoulder pads for garments the steps of: disposing filler material in the space defined by a cover means comprising a cover sheet and a reinforcing sheet of sized material, folded so that a portion of the cover means lies over the adjacent portion of the cover means; curving the assembly of parts defined in the foregoing; and curing said assembly while it is so curved, said curing comprising drying out from the assembly previously applied moisture.

41. In a method of manufacturing shoulder pads for garments the steps of: disposing filler material in the space defined by a cover means comprising a cover sheet and a moistened reinforcing sheet of sized material, folded so that a portion of the cover means lies over the adjacent portion of the cover means; curving the assembly of parts defined in the foregoing; and curing said assembly while it is so curved, said curing comprising drying out from the assembly moisture previously applied to said reinforcing sheet.

42. In a method of manufacturing shoulder pads for garments the steps of: disposing filler material in the space defined by a cover means folded so that a portion of the cover means lies over the adjacent portion of the cover means; curving the assembly of parts defined in the foregoing by placing one side thereof against the surface of a curved forming member; applying a member to give the remaining surface of said assembly a curved form; and curing said assembly while it is so curved, said curing comprising drying out from the assembly previously applied moisture.

43. In a a method of manufacturing shoulder pads for garments the steps of: disposing filler material in the space defined by a cover means comprising a cover sheet and a moistened reinforcing sheet of sized material, folded so that a portion of the cover means lies over the adjacent portion of the cover means; curving the assembly of parts defined in the foregoing by placing one side thereof against the surface of a curved forming member; applying a member to give the remaining surface of said assembly a curved form; and curing said assembly while it is so curved, said curing comprising drying out from the assembly moisture previously applied to said reinforcing sheet.

44. In a method of manufacturing shoulder pads for garments the steps of: disposing filler material in the space defined by a cover means folded so that a portion of the cover means lies over the adjacent portion of the cover means; curving the assembly of parts defined in the foregoing by placing one side thereof against the surface of a convex forming member; applying a tension member so as to hold against said convex forming member the portion of said cover means adjacent the fold and adjacent said forming member; and curing said assembly while it is so curved, said curing comprising applying heat to the assembly for a time sufficient to effect retention of curvature of said assembly.

45. In a method of manufacturing shoulder pads for garments the steps of: disposing filler material in the space defined by a cover means comprising a cover sheet and a moistened reinforcing sheet of sized material, folded so that a portion of the cover means lies over the adjacent portion of the cover means; curving the assembly of parts defined in the foregoing by placing one side thereof against the surface of a convex forming member; applying a member to give the remaining surface of said assembly a curved form; applying a tension member so as to hold against said convex forming member the portion of said cover means adjacent the fold and adjacent said forming member; and curing said assembly while it iso curved, said curing comprising drying out from the assembly moisture previously applied to said reinforcing sheet.

ROBERT B. PERRY.

REFERENCES CITED

The following references are of record in the file of this patent:

UNITED STATES PATENTS

| Number | Name | Date |
|---|---|---|
| 965,378 | Dutilleul | July 26, 1910 |
| 1,056,896 | Fischman | Mar. 25, 1913 |
| 2,172,499 | Chassaing | Sept. 12, 1939 |
| 2,389,934 | Rothenberg et al. | Nov. 27, 1945 |
| 2,461,881 | Diamond | Feb. 15, 1949 |